(12) United States Patent
Berggren

(10) Patent No.: US 11,315,411 B2
(45) Date of Patent: Apr. 26, 2022

(54) VEHICLE ALERT DEVICE AND METHOD

(71) Applicant: Ningbo Geely Automobile Research & Development Co., Ltd., Ningbo (CN)

(72) Inventor: Alexander Berggren, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 17/039,681

(22) Filed: Sep. 30, 2020

(65) Prior Publication Data

US 2021/0020029 A1    Jan. 21, 2021

Related U.S. Application Data

(63) Continuation of application No. PCT/CN2019/081253, filed on Apr. 3, 2019.

(30) Foreign Application Priority Data

Apr. 4, 2018  (EP) .................................... 18165676

(51) Int. Cl.
*G08G 1/005* (2006.01)
*H04R 25/00* (2006.01)
(Continued)

(52) U.S. Cl.
CPC .............. *G08G 1/005* (2013.01); *B60Q 1/525* (2013.01); *B60Q 9/008* (2013.01); *G08B 21/02* (2013.01); *H04R 25/00* (2013.01)

(58) Field of Classification Search
CPC ........ G08G 1/005; G08B 21/02; H04R 25/00; B60Q 1/525; B60Q 9/008
(Continued)

(56) References Cited

U.S. PATENT DOCUMENTS 3,659,056 A * 4/1972 Morrison .................. H04B 5/06
381/315
5,425,104 A * 6/1995 Shennib ............... G09B 21/009
381/326
(Continued)

FOREIGN PATENT DOCUMENTS

CN        102387430 A     3/2012
CN        103377539 A    10/2013
(Continued)

OTHER PUBLICATIONS

International Search Report and Written Opinion from corresponding International Application No. PCT/CN2019/081253, dated Jun. 28, 2019, 9 pages.
(Continued)

*Primary Examiner* — John A Tweel, Jr.
(74) *Attorney, Agent, or Firm* — Tucker Ellis LLP

(57) ABSTRACT

An Audio Frequency Induction Loop receiving device, an Audio Frequency Induction Loop transmitting device, a system and a method for alerting a person with impaired hearing about a moving vehicle are disclosed. The Audio Frequency Induction Loop receiving device comprises an Audio Frequency Induction Loop receiver and a processing circuitry. The Audio Frequency Induction Loop receiver is configured to receive a signal via a magnetic field generated by the Audio Frequency Induction Loop transmitting device installed in the vehicle. The processing circuitry is configured to cause the Audio Frequency Induction Loop receiving device to detect the magnetic field generated by the Audio Frequency Induction Loop transmitting device and generate an alert signal for alerting about the moving vehicle.

11 Claims, 3 Drawing Sheets

(51) Int. Cl.
*B60Q 9/00* (2006.01)
*B60Q 1/52* (2006.01)
*G08B 21/02* (2006.01)

(58) Field of Classification Search
USPC ........................................................ 340/539.1
See application file for complete search history.

(56) References Cited

U.S. PATENT DOCUMENTS

| | | | |
|---|---|---|---|
| 9,113,274 B2 * | 8/2015 | Pansell | H04R 25/305 |
| 9,307,329 B2 * | 4/2016 | Saarimaa | H01Q 7/00 |
| 10,403,113 B1 * | 9/2019 | Antar | B60L 3/00 |
| 2009/0224932 A1 | 9/2009 | Kilim | |
| 2010/0013661 A1 * | 1/2010 | Hughes, Jr | G09B 21/009 |
| | | | 340/4.1 |
| 2011/0199199 A1 | 8/2011 | Perkins | |
| 2013/0141576 A1 | 6/2013 | Lord | |
| 2013/0158795 A1 | 6/2013 | Hahne | |

FOREIGN PATENT DOCUMENTS

| | | |
|---|---|---|
| CN | 104680714 A | 6/2015 |
| CN | 105225474 A | 1/2016 |
| CN | 106448050 A | 2/2017 |
| DE | 102012206522 A1 | 10/2013 |
| EP | 2424276 A2 | 2/2012 |
| JP | 2002074593 A | 3/2002 |
| JP | 2005289175 A | 10/2005 |
| JP | 2009098854 A | 5/2009 |
| JP | 2011164064 A | 8/2011 |
| JP | 2011255830 A | 12/2011 |
| JP | 2012022487 A | 2/2012 |
| KR | 101065018 B1 | 9/2011 |

OTHER PUBLICATIONS

International Preliminary Report on Patentability from corresponding International Application No. PCT/CN2019/081253, dated Jun. 16, 2020, 10 pages.

* cited by examiner

VEHICLE ALERT DEVICE AND METHOD

RELATED APPLICATION DATA

This application is a continuation of International Patent Application No. PCT/CN2019/081253, filed Apr. 3, 2019, which claims the benefit of European Patent Application No. 18165676.0, filed Apr. 4, 2018, the disclosures of which are incorporated herein by reference in their entireties.

TECHNICAL FIELD

The disclosure pertains to the field of alerting a person of a moving vehicle.

BACKGROUND

Today the number of vehicles that make less sound, or no sound at all, are becoming more and more common. Examples of such vehicles are electric vehicles, hybrid electric vehicles and plug-in hybrid electric vehicles, all equipped with quiet electric motors. Traditional vehicles with combustion engines, such as diesel and petrol combustion engines, naturally make a sound when the engine is running. During acceleration of a vehicle with a combustion engine, the combustion engine makes a distinct sound and, even if a person that is in the vicinity of the vehicle does not see the vehicle, the person can hear the vehicle, and hence become aware of the vehicle before e.g. crossing a street. A problem with electric vehicles is that they are very quiet, and do not make any distinct sound, e.g., such as the acceleration sound as of a vehicle with a combustion engine. This is a problem for all persons, like pedestrians, cyclists, the blind and also for people with impaired hearing.

When a person is walking on a street it can be difficult to know if an electric vehicle is approaching the person unless the person can see the electric vehicle. This causes a risk in the safety to the persons in the vicinity of the moving electric vehicle.

One solution that exists today is that electric vehicles have been equipped with a sound producing device so that the electric vehicle becomes detectable by a sound that a person in the vicinity of the electric vehicle can hear. This is a way to alert pedestrians in the vicinity of the vehicle of the presence of the electric vehicle. This sound can be trigged by the driver, like a horn, or be trigged by that the electric vehicle is moving.

SUMMARY

Today there is a demand for a better way to alert persons in the vicinity of a moving vehicle, and in particular to alert a person with impaired hearing of the presence of a quiet electric vehicle.

Many persons with impaired hearing today make use of a so called Audio Frequency induction Loop System, also known as a "hearing loop" system to improve hearing of sounds.

The inventor proposes a device, a method and system that can be used to solve the problem with quiet vehicles that are a safety risk for people with impaired hearing. The solution is both a cost effective solution and a user friendly, intuitive and safe solution. The invention further enhances the detection of a vehicle in the proximity by utilizing the magnetic field in an Audio Frequency induction Loop System, or "hearing loop" systems, according to some aspects of the invention.

The disclosure proposes an Audio Frequency Induction Loop receiving device for alerting about a moving vehicle. The Audio Frequency Induction Loop receiving device comprises an Audio Frequency Induction Loop receiver configured to receive a signal via a magnetic field generated by an Audio Frequency Induction Loop transmitting device installed in a vehicle. The Audio Frequency Induction Loop receiving device further comprises a processing circuitry configured to cause the Audio Frequency Induction Loop receiving device to detect a magnetic field generated by an Audio Frequency Induction Loop transmitting device installed in a vehicle and generate an alert signal for alerting about the moving vehicle. This means that a person that is wearing the Audio Frequency Induction Loop receiving device can be alerted about a moving vehicle even if the vehicle itself is quiet, which is often the case for an electric vehicle with an electric motor.

According to an aspect the Audio Frequency Induction Loop receiving device further comprises a field strength meter connected to the Audio Frequency Induction Loop receiver for determining the field strength of a detected magnetic field. The processing circuitry is configured to cause the Audio Frequency Induction Loop receiving device to detect a magnetic field generated by an Audio Frequency Induction Loop transmitting device installed in a vehicle and determine, using the field strength meter, the field strength of the detected magnetic field. The processing circuitry is further configured to determine a relative distance to the moving Audio Frequency Induction Loop transmitting device based on the determined field strength of the detected magnetic field, wherein a weak field strength represents a distant vehicle and a strong field strength represents a less distant vehicle and generate an alert signal based on the relative distance for alerting about the moving vehicle. In other words, the Audio Frequency Induction Loop receiving device uses the field strength meter to generate an alert signal that is dependent on the distance between the Audio Frequency Induction Loop receiving device and a vehicle with an installed Audio Frequency Induction Loop transmitting device.

According to an aspect the alert signal is based on the received signal. This means that the alert signal can be based on the received signal that is, e.g., a predefined engine sound, or a picked up sound by a microphone, e.g., from the engine room of the vehicle, exhaust pipe or from the road/tires.

According to an aspect the alert signal comprises any of a predefined sound, tactile or visual alert signal. An advantage with this is that the alert signal can be generated by the Audio Frequency Induction Loop receiving device.

According to an aspect the Audio Frequency Induction Loop receiving device is a hearing aid device for alerting a person with impaired hearing wearing the hearing aid device. In other words, the Audio Frequency Induction Loop receiving device is part of a hearing aid device used for improving the hearing of the person wearing the hearing aid device.

According to an aspect the Audio Frequency Induction Loop receiving device is any of a smartphone, a vehicle, a traffic light, a toll station or a node in a traffic system. Hence, this means that the Audio Frequency Induction Loop receiver is integrated in an existing hardware configured to generate an alert signal for alerting about the moving vehicle.

According to an aspect the alert signal comprises any of an analogue or digital signal that is transferred to an external device. According to an aspect the Audio Frequency Induction Loop receiving device is configured to communicate with an external device that is configured to reproduce the alert signal. In other words, Audio Frequency Induction Loop receiving device is configured to operate with an external device for alerting via the external device.

According to an aspect the external device is a portable electronic device for alerting the person wearing the portable electronic device. With the common use of portable electronic devices, this means that, e.g., a smartphone can alert the user of the smartphone via any user interface of the smartphone.

The disclosure further proposes an Audio Frequency Induction Loop transmitting device installed in the vehicle configured to generate a signal to be transferred via a magnetic field to an Audio Frequency Induction Loop receiving device, wherein the magnetic field generated by the Audio Frequency Induction Loop transmitting device is used for generating an alert signal for alerting an Audio Frequency Induction Loop receiving device about the moving vehicle. An advantage with the Audio Frequency Induction Loop transmitting device installed in the vehicle is that any person wearing an Audio Frequency Induction Loop receiving device, for example a person with impaired hearing wearing a hearing aid device including an Audio Frequency Induction Loop receiving device, can be alerted about the moving vehicle.

According to an aspect the signal comprises a vehicle engine sound. This is a very intuitive sound that makes the person think about a vehicle.

According to an aspect the vehicle engine sound is adapted dependent on any of the vehicle speed, or vehicle engine revolutions per minute. In other words, the alert signal of, e.g., an accelerating vehicle or a vehicle at high speed will have the same characteristics as the sound of a vehicle with, e.g., a combustion engine.

According to an aspect the signal is routed through a loop transmitter amplifier for amplifying the field to be received by the Audio Frequency Induction Loop receiving device. This means that the field strength can be adjusted so that the Audio Frequency Induction Loop transmitting device is detectable on a longer or shorter distance by the Audio Frequency Induction Loop receiving device.

The disclosure further proposes a method for alerting a person with impaired hearing about a moving vehicle. The method comprises the step of detecting a magnetic field generated by an Audio Frequency Induction Loop transmitting device installed in the vehicle followed by the step of generating an alert signal for alerting about the moving vehicle. This means that a person that is wearing an Audio Frequency Induction Loop receiving device can be alerted about the moving vehicle even if the vehicle itself is quiet, which is often the case for an electric vehicle with an electric motor.

According to an aspect the method further comprises the step of determining, using a field strength meter, a field strength of the detected magnetic field followed by the step of determining, a relative distance to the moving Audio Frequency Induction Loop transmitting device based on the determined field strength of the detected magnetic field, wherein a weak field strength represents a distant vehicle and a strong field strength represents a less distant vehicle. In other words, an Audio Frequency Induction Loop receiving device is using a field strength meter to generate an alert signal that is dependent on the distance between the Audio Frequency Induction Loop receiving device and the vehicle with an installed Audio Frequency Induction Loop transmitting device.

The disclosure further proposes a vehicle alert system for alerting about an approaching vehicle. The vehicle alert system comprise an Audio Frequency Induction Loop receiving device as previously described and an Audio Frequency Induction Loop transmitting device according to claims as previously described.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
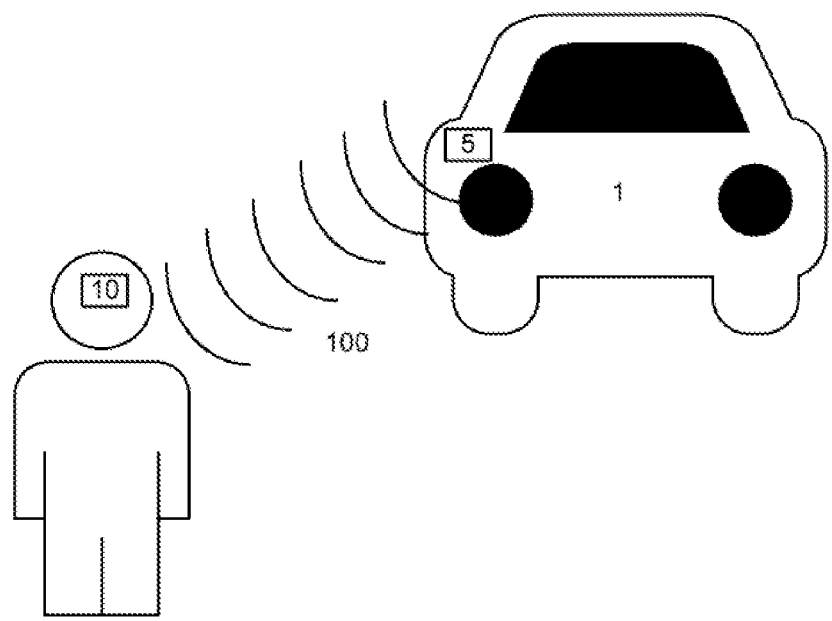
FIG. 1 illustrates an example of the proposed vehicle alert system.

Aspects of the present disclosure will be described more fully hereinafter with reference to the accompanying drawings. The method and system disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Today there is a demand for a better way to alert persons in the vicinity of a moving vehicle, and in particular to alert a person with impaired hearing of the presence of a quiet electric vehicle.

Many persons with impaired hearing today make use of a so called Audio Frequency induction Loop System, also known as a "hearing loop" system to improve hearing of sounds. In an Audio Frequency Induction Loop System a signal, e.g., a sound, is picked up by a microphone and transferred via a magnetic field, i.e., not an "electromagnetic" field, that is received by a small coil within a hearing aid or any other suitable receiver that then reproduces the transferred signal. The magnetic field is detectable at a distance that is dependent on a loop amplifier that amplifies the signal. The magnetic field strength is proportional to a current flowing in the loop. Field strength meters adapted for measuring the magnetic field are today used for measuring and setting up a hearing loop system.

Typically the hearing aid is worn on the ear of a person with impaired hearing but can be worn by any person. There are also other suitable receivers that can reproduce the signal, in addition to a hearing aid, and such receiver can be integrated with any other existing sound producing device.

The Audio Frequency induction Loop Systems, or "hearing loop" systems, existing today are fixed, e.g. installed in homes, churches, conference halls and cinemas, etc. They are often used to amplify a sound produced in the room so that a person with impaired hearing can hear the produced sound better.

The inventor proposes a device, a method and system that can be used to solve the problem with quiet vehicles that are a safety risk for people with impaired hearing. The solution is both a cost effective solution and a user friendly, intuitive and safe solution. The invention further enhances the detection of a vehicle in the proximity by utilizing the magnetic field in Audio Frequency induction Loop System, or "hearing loop" system, according to some aspects of the invention.

Figure 2:
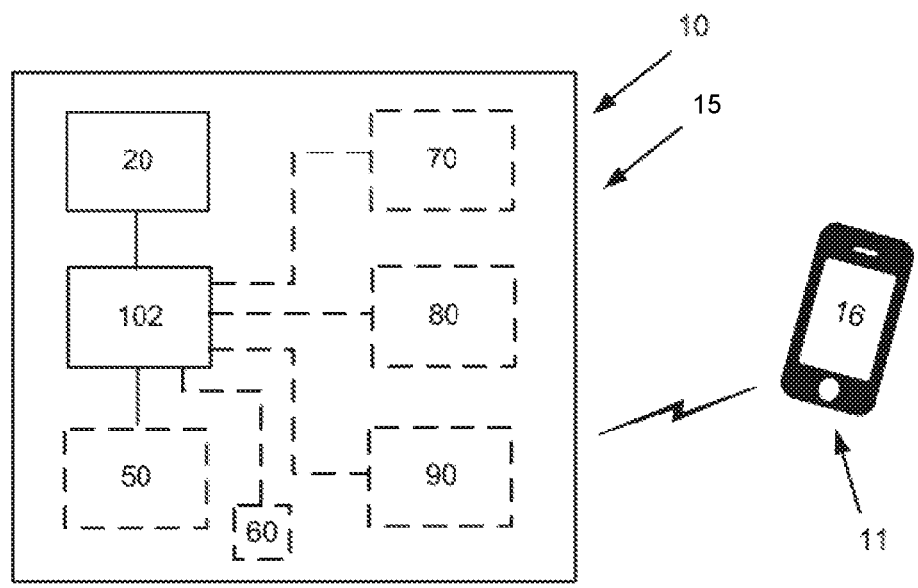
FIG. 2 illustrates an Audio Frequency Induction Loop receiving device.

The disclosure proposes an Audio Frequency Induction Loop receiving device 10 for alerting about a moving vehicle. The Audio Frequency Induction Loop receiving device 10 comprises an Audio Frequency Induction Loop receiver 20 configured to receive a signal via a magnetic field 100 generated by an Audio Frequency Induction Loop transmitting device 5 installed in a vehicle, as illustrated in FIG. 1. The vehicle 1 in the FIG. 1 is a car but it should be noted that the Audio Frequency Induction Loop transmitting device 5 can be installed in any vehicle such as a bus, truck, tractor, excavator, train, bike, motorbike boat, aero plane, etc. The Audio Frequency Induction Loop receiving device 10, that is illustrated in FIG. 2, further comprises a processing circuitry 102 configured to cause the Audio Frequency Induction Loop receiving device 10 to detect a magnetic field 100 generated by an Audio Frequency Induction Loop transmitting device 5 installed in a vehicle 1 and generate an alert signal for alerting about the moving vehicle 1. This means that a person that is wearing the Audio Frequency Induction Loop receiving device 10 can be alerted about a moving vehicle even if the vehicle itself is quiet which is often the case for an electric vehicle with an electric motor.

According to an aspect the Audio Frequency Induction Loop receiving device 10 further comprises a field strength meter 50 connected to the Audio Frequency Induction Loop receiver 20 for determining the field strength of a detected magnetic field 100. The field strength meter 50 is typically integrated with the other components of the Audio Frequency Induction Loop receiving device 10. According to an aspect the strength meter 50 is a stand-alone component that is connected to Audio Frequency Induction Loop receiving device 10 via a wired or wireless interface.

The processing circuitry 102 is configured to cause the Audio Frequency Induction Loop receiving device 10 to detect a magnetic field 100 generated by an Audio Frequency Induction Loop transmitting device 5 installed in a vehicle and determine, using the field strength meter 50, the field strength of the detected magnetic field 100. Existing field strength meters for Audio Frequency induction Loop System, or "hearing loop" systems, are used when installing the Audio Frequency induction Loop System, or "hearing loop" systems, to measure the variation in the magnetic field 100 at different distances and at different locations inside a building. The use of field strength meters 50 outdoors gives a measurement that is correlated to the distance from the Audio Frequency Induction Loop transmitting device 5. This is due to that the propagation of the magnetic field 100 outdoors is not interfered by walls and, e.g., reinforcement bars in a building, etc.

Figure 3A:
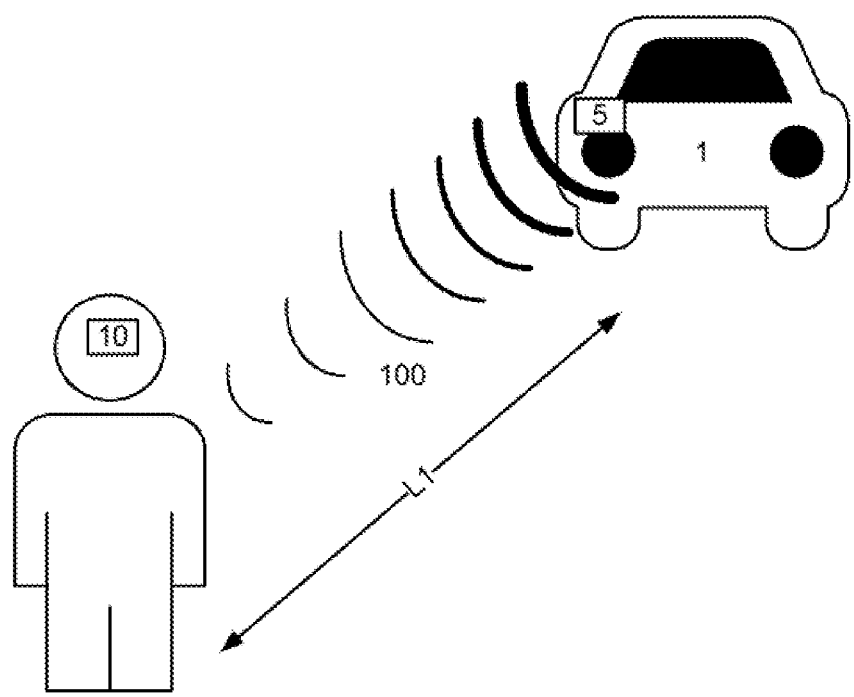
FIG. 3A illustrates an example of a weak field strength that represents a distant vehicle.
Figure 3B:
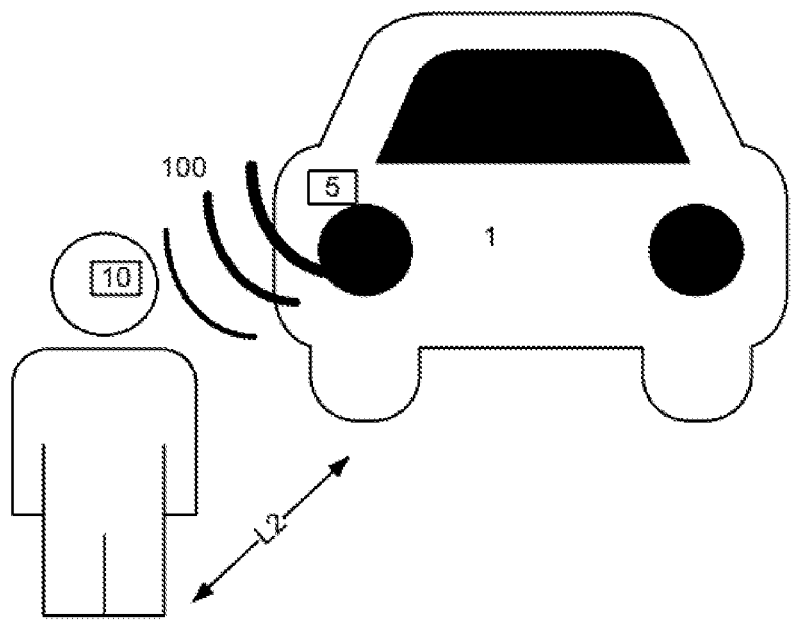
FIG. 3B illustrates an example of a strong field strength the represents a less distant vehicle.

The processing circuitry 102 is configured to determine a relative distance to the moving Audio Frequency Induction Loop transmitting device 5 based on the determined field strength of the detected magnetic field 100, wherein a weak field strength represents a distant vehicle and a strong field strength represents a less distant vehicle and generate an alert signal based on the relative distance for alerting about the moving vehicle 1. The illustration in FIG. 3A illustrates a weak field strength that is received at the Audio Frequency Induction Loop receiving device 10. Hence, as illustrated in FIG. 3A, the vehicle 1 with the installed Audio Frequency Induction Loop transmitting device 5 is determined to be a distance L1 that is distant from the person using the Audio Frequency Induction Loop receiving device 10. The illustration in FIG. 3B illustrates a strong field strength that is received at the Audio Frequency Induction Loop receiving device 10. Hence, as illustrated in FIG. 3B, the vehicle 1 with the installed Audio Frequency Induction Loop transmitting device 5 is determined to be a distance L2 that is less distant to the person using the Audio Frequency Induction Loop receiving device 10.

In other words, the Audio Frequency Induction Loop receiving device 10 uses the field strength meter 50 to generate an alert signal that is dependent on the distance between the Audio Frequency Induction Loop receiving device 10 and a vehicle with an installed Audio Frequency Induction Loop transmitting device 5. According to an aspect the intensity of the alert signal is increased when the relative distance to the moving Audio Frequency Induction Loop transmitting device 5 decreases. According to an aspect the intensity of the alert signal is decreased when the relative distance to the moving Audio Frequency Induction Loop transmitting device 5 increases.

According to an aspect the alert signal is based on the received signal. This means that the alert signal can be based on the received signal that is, e.g., a predefined engine sound, or a picked up sound by a microphone, e.g., from the engine room of the vehicle, the exhaust pipe of the vehicle or from the tires of the vehicle.

According to an aspect the alert signal comprises any of a predefined sound, tactile or visual alert signal. According to an aspect the alert signal is generated by the processing circuitry 102 of the Audio Frequency Induction Loop receiving device 10. According to an aspect the Audio Frequency Induction Loop receiving device 10 further comprises a light 60 configured to generate a visible alert signal. In one example the light is configured to shift intensity depending on the alert signal. In one example plural lights are used to create the alert signal.

According to an aspect the Audio Frequency Induction Loop receiving device 10 further comprises a speaker 70 configured to generate a hearable alert signal. According to an aspect the Audio Frequency Induction Loop receiving device 10 further comprises a vibrator 80 configured to generate a tactile alert signal. According to an aspect the Audio Frequency Induction Loop receiving device 10 further comprises a display 90 configured to generate a visual alert signal. In one example a graphical user interface is used to visualize the alert signal that is, e.g., visualizing a distance on a scale.

An advantage with this is that the alert signal can be generated by the Audio Frequency Induction Loop receiving device 10 and produced via any of the light 60, the speaker 70, the vibrator 80 or the display 90 to the user of the Audio Frequency Induction Loop receiving device 10.

According to an aspect the Audio Frequency Induction Loop receiving device 10 is a hearing aid device 15 for alerting a person with impaired hearing wearing the hearing aid device 15. In other words, the Audio Frequency Induction Loop receiving device 10 is part of a hearing aid device 15 used for improving the hearing of the person wearing the hearing aid device 15.

According to an aspect the Audio Frequency Induction Loop receiving device 10 is any of a smartphone, a vehicle, a traffic light, a toll station or a node in a traffic system. Hence, this means that the Audio Frequency Induction Loop receiver 20 is integrated in an existing hardware configured to generate an alert signal for alerting about the moving vehicle. According to an aspect the Audio Frequency Induction Loop transmitting device 5 continuously transmits while the vehicle is moving. This means that not only persons wearing the Audio Frequency Induction Loop receiving device 10 can detect the vehicle, but an Audio Frequency Induction Loop receiving device 10 can also be used for inputting information to a machine about that the vehicle is moving. In one example a traffic system can detect if there is a vehicle approaching a crossing and optimize the signaling of the red lights depending on the traffic that then is determined by detecting the magnetic field 100 generated by the Audio Frequency Induction Loop transmitting device 5 installed in the vehicles 1 approaching the red light.

According to an aspect the alert signal comprises any of an analogue or digital signal that is transferred to an external device 11. This is illustrated in FIG. 2. According to an aspect the Audio Frequency Induction Loop receiving device 10 is configured to communicate with an external device 11 that is configured to reproduce the alert signal. In other words, Audio Frequency Induction Loop receiving device 10 is configured to operate with an external device 11 for alerting via the external device 11. In an example the Audio Frequency Induction Loop receiving device 10 is a dedicated receiving device that is connected to external device 11 via a local wireless network. For example, the Audio Frequency Induction Loop receiving device 10 is a dedicated receiving device that is integrated in, e.g., clothes or accessories worn by a person with impaired hearing and connected to an external device 11 for a better user experience. According to an aspect the external device 11 is a portable electronic device 16 for alerting the person wearing the portable electronic device 16. With the common use of portable electronic devices 11, this means that, e.g., a portable electronic device 16 such as a smartphone can alert the user via any user interface of the smartphone, such as via a vibration, a sound, a visual effect or a flash light, etc. According to an aspect the external device 11 is a smartphone that is adapted to interrupt or pause multimedia that is being played back in order to alert the person using the smartphone with the alert signal. In one example the alert signal is played back in parallel with multimedia on the smartphone.

The disclosure further proposes an Audio Frequency Induction Loop transmitting device 5 installed in the vehicle configured to generate a signal to be transferred via a magnetic field 100 to an Audio Frequency Induction Loop receiving device 10, wherein the magnetic field 100 generated by the Audio Frequency Induction Loop transmitting device is used for generating an alert signal for alerting an Audio Frequency Induction Loop receiving device 10 about the moving vehicle. This is illustrated in FIG. 1. An advantage with the Audio Frequency Induction Loop transmitting device 5 installed in the vehicle is that any person wearing an Audio Frequency Induction Loop receiving device 10, for example a person with impaired hearing wearing a hearing aid device 15 including an Audio Frequency Induction Loop receiving device 10, can be alerted about the moving vehicle.

According to an aspect the signal comprises a vehicle engine sound. This is a very intuitive sound that makes the person think about a vehicle.

According to an aspect the vehicle engine sound is adapted dependent on any of the vehicle speed, or the vehicle engine revolutions per minute. In other words, the alert signal of, e.g., an accelerating vehicle or a vehicle at high speed will have the same characteristics as the sound of a vehicle with, e.g., a combustion engine.

According to an aspect the signal is routed through a loop transmitter amplifier for amplifying the field to be received by the Audio Frequency Induction Loop receiving device 10. The magnetic field strength is proportional to a current flowing in the loop. This means that the field strength can be adjusted so that the Audio Frequency Induction Loop transmitting device 5 is detectable on a longer or shorter distance by the Audio Frequency Induction Loop receiving device 10.

Figure 4:
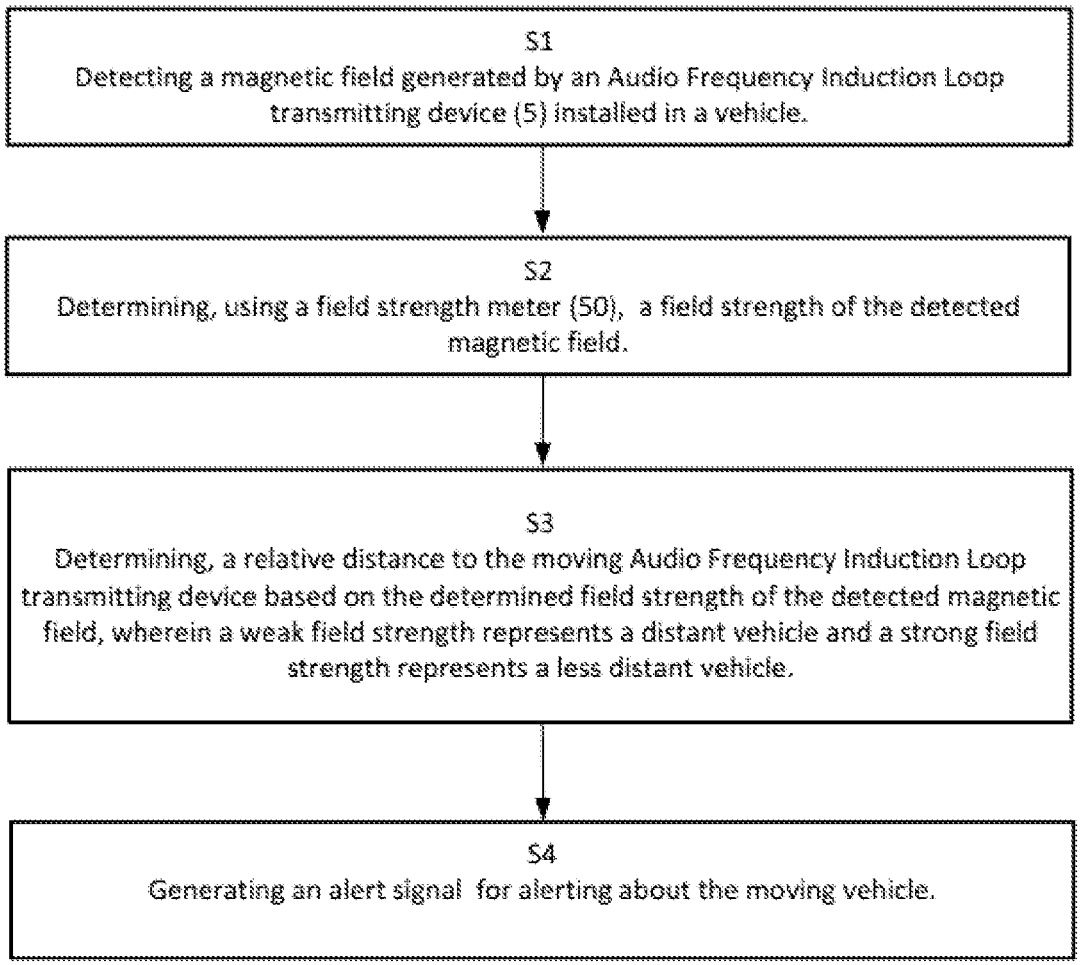
FIG. 4 illustrates a flow chart of the proposed method and according to aspect of the method.

The disclosure further proposes a method for alerting a person with impaired hearing about a moving vehicle as illustrated in FIG. 4. The method comprises the step of S1 detecting a magnetic field 100 generated by an Audio Frequency Induction Loop transmitting device 5 installed in a vehicle 1 followed by the step of S4 generating an alert signal for alerting about the moving vehicle 1. This means that a person that is wearing an Audio Frequency Induction Loop receiving device 10 can be alerted about a moving vehicle even if the vehicle itself is quiet, which is often the case for an electric vehicle with an electric motor.

According to an aspect the method further comprises the step of S2 determining, using a field strength meter 50, a field strength of the detected magnetic field 100 followed by the step of S3 determining, a relative distance to the moving Audio Frequency Induction Loop transmitting device based on the determined field strength of the detected magnetic field 100, wherein a weak field strength represents a distant vehicle and a strong field strength represents a less distant vehicle. In other words, an Audio Frequency Induction Loop receiving device 10 is using a field strength meter 50 to generate an alert signal that is dependent on the distance between the Audio Frequency Induction Loop receiving device 10 and a vehicle with an installed Audio Frequency Induction Loop transmitting device 5.

The disclosure further proposes a vehicle alert system for alerting about an approaching vehicle. The vehicle alert system comprises an Audio Frequency Induction Loop receiving device 10 as previously described and an Audio Frequency Induction Loop transmitting device 5 according to claims as previously described.

The disclosure further proposes a computer program product comprising a non-transitory computer readable medium, having thereon a computer program comprising program instructions, the computer program being loadable into a processing circuitry 102 and configured to cause execution of the method when the computer program is run by the processing circuitry 102.

The different aspects of the disclosure can be combined with one or more of the other different aspects. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A hearing aid device for alerting a person with impaired hearing wearing the hearing aid device about a moving vehicle, the hearing aid device comprising:
   an Audio Frequency Induction Loop receiver configured to receive a signal via a magnetic field generated by an Audio Frequency Induction Loop transmitting device installed in a vehicle;
   a field strength meter connected to the Audio Frequency Induction Loop receiver for determining a field strength of a detected magnetic field;
   a processing circuitry configured to cause the hearing aid device to:
      detect a magnetic field generated by an Audio Frequency Induction Loop transmitting device installed in a vehicle;
      determine, using the field strength meter, the field strength of the detected magnetic field at the hearing aid device;
      determine a relative distance to the moving Audio Frequency Induction Loop transmitting device based on the determined field strength of the detected magnetic field at the hearing aid device, wherein a weak field strength represents a distant vehicle and a strong field strength represents a less distant vehicle; and
      generate an alert signal based on the relative distance for alerting about the moving vehicle.

2. The hearing aid device according to claim 1, wherein the alert signal is based on the received signal.

3. The hearing aid device according to claim 1, wherein the alert signal comprises any of a predefined sound, tactile or visual alert signal.

4. The hearing aid device according to claim 1, wherein the alert signal comprises any of an analogue or digital signal that is transferred to an external device.

5. The hearing aid device of claim 1, wherein the field strength of the detected magnetic field is adjustable by the Audio Frequency Induction Loop transmitting device.

6. An Audio Frequency Induction Loop transmitting device installed in a vehicle configured to generate a magnetic field receivable by an Audio Frequency Induction Loop receiving device, wherein the magnetic field generated by the Audio Frequency Induction Loop transmitting device has a magnetic field strength that is adjustable by the Audio Frequency Induction Loop transmitting device, and transmits an alert signal for alerting an Audio Frequency Induction Loop receiving device about a moving vehicle and allowing the Audio Frequency Induction Loop receiving device to determine a relative distance to the moving Audio Frequency Induction Loop transmitting device based on the determined field strength of the magnetic field received at the Audio Frequency Loop receiving device.

7. The Audio Frequency Induction Loop transmitting device according to claim 6, wherein the alert signal represents a vehicle engine sound.

8. The Audio Frequency Induction Loop transmitting device according to claim 7, wherein the represented vehicle engine sound is adapted dependent on any of the vehicle speed, or vehicle revolutions per minute.

9. A method for alerting a person with impaired hearing about a moving vehicle, the method comprising:
   detecting, at a hearing aid device, a magnetic field generated by an Audio Frequency Induction Loop transmitting device installed in a vehicle;
   determining, using a field strength meter at the hearing aid device, a field strength of the detected magnetic field;
   determining, a relative distance to the moving Audio Frequency Induction Loop transmitting device based on the determined field strength of the detected magnetic field at the hearing aid device, wherein a weak field strength represents a distant vehicle and a strong field strength represents a less distant vehicle; and
   generating an alert signal based on the relative distance for alerting about the moving vehicle.

10. A vehicle alert system for alerting about an approaching vehicle, the vehicle alert system comprising:
    the hearing aid device according to claim 1; and
    an Audio Frequency Induction Loop transmitting device installed in a vehicle configured to generate a magnetic field receivable by the hearing aid device, wherein the magnetic field generated by the Audio Frequency Induction Loop transmitting device transmits an alert signal for alerting the hearing aid device about a moving vehicle.

11. The hearing aid device of claim 9, wherein the field strength of the detected magnetic field is adjustable by the Audio Frequency Induction Loop transmitting device.

* * * * *